United States Patent
Eisenbeis et al.

(10) Patent No.: US 10,533,682 B2
(45) Date of Patent: Jan. 14, 2020

(54) METHODS AND APPARATUS TO DIAGNOSE A VALVE USING ELECTRIC VALVE ACTUATORS

(71) Applicant: Fisher Controls International LLC, Marshalltown, IA (US)

(72) Inventors: Clyde T. Eisenbeis, Marshalltown, IA (US); Thomas Pesek, Ankeny, IA (US); Ross Schade, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 921 days.

(21) Appl. No.: 14/553,362

(22) Filed: Nov. 25, 2014

(65) Prior Publication Data

US 2015/0149100 A1    May 28, 2015

Related U.S. Application Data

(60) Provisional application No. 61/908,377, filed on Nov. 25, 2013.

(51) Int. Cl.
| | | |
|---|---|---|
| *F16K 37/00* | (2006.01) | |
| *G01B 7/00* | (2006.01) | |
| *G01B 7/30* | (2006.01) | |
| *G01M 13/02* | (2019.01) | |

(52) U.S. Cl.
CPC .......... *F16K 37/0041* (2013.01); *G01B 7/003* (2013.01); *G01B 7/30* (2013.01); *G01M 13/02* (2013.01); *G01B 2210/58* (2013.01)

(58) Field of Classification Search
CPC ..... F16K 37/0041; F16K 31/04; G01B 7/003; G01B 7/30; G01B 2210/58; G01M 13/02

USPC .......................................................... 702/58
See application file for complete search history.

(56) References Cited

U.S. PATENT DOCUMENTS

| | | | |
|---|---|---|---|
| 4,679,271 A * | 7/1987 | Field | A47L 9/2831 |
| | | | 15/320 |
| 4,694,390 A | 9/1987 | Lee | |
| 4,990,840 A | 2/1991 | Migda | |
| 5,966,679 A | 10/1999 | Snowbarger et al. | |
| 2005/0156550 A1 | 7/2005 | Kamio et al. | |
| 2009/0194721 A1 | 8/2009 | Watanabe et al. | |
| 2009/0230338 A1* | 9/2009 | Sanders | G05B 19/39 |
| | | | 251/129.01 |

(Continued)

OTHER PUBLICATIONS

International Searching Authority, "International Preliminary Report on Patentability", issued in connection with PCT patent application No. PCT/US2014/067007, dated Jun. 9, 2016, 10 pages.

(Continued)

*Primary Examiner* — Fernando Hidalgo
(74) *Attorney, Agent, or Firm* — Hanley, Flight & Zimmerman, LLC

(57) ABSTRACT

Methods and apparatus to diagnose a valve using electric valve actuators are disclosed. An example apparatus includes an electric motor to actuate a valve, rotation sensors to monitor a rotation of a drive shaft associated with the electric motor to determine a distance travelled by the drive shaft, and a valve position sensor to monitor a position of a flow control member of the valve. The example electric valve actuator further includes a processor to generate an alert based on feedback from the rotation sensors and the valve position sensor, the alert associated with a failure of the valve.

20 Claims, 6 Drawing Sheets

(56) References Cited

U.S. PATENT DOCUMENTS

| | | | | |
|---|---|---|---|---|
| 2010/0288037 A1* | 11/2010 | Gibson | ............... | F01L 1/34 |
| | | | | 73/114.79 |
| 2011/0115319 A1 | 5/2011 | Schade et al. | | |
| 2011/0180165 A1* | 7/2011 | Hansson | ............... | F16K 1/36 |
| | | | | 137/554 |
| 2012/0143053 A1* | 6/2012 | Fago | ............... | A61M 31/005 |
| | | | | 600/432 |

OTHER PUBLICATIONS

International Searching Authority, "Search Report", issued in connection with PCT patent application No. PCT/US2014/067007, dated Apr. 17, 2015, 5 pages.

International Searching Authority, "Written Opinion", issued in connection with PCT patent application No. PCT/US2014/067007, dated Apr. 17, 2015, 8 pages.

* cited by examiner

METHODS AND APPARATUS TO DIAGNOSE A VALVE USING ELECTRIC VALVE ACTUATORS

FIELD OF THE DISCLOSURE

This disclosure relates generally to actuators and, more particularly, to methods and apparatus to diagnose a valve using electric valve actuators.

BACKGROUND

Control valves (e.g., sliding stem valves) are commonly used in process control systems to control the flow of process fluids. A control valve typically includes an actuator (e.g., an electric actuator, a hydraulic actuator, etc.) that automates operation of the control valve. Electric actuators often employ a motor operatively coupled to a flow control member via a drive system (e.g., one or more gears). During operation, when electric power is supplied to the motor, the electric actuator moves the flow control member between a closed position and an open position to regulate fluid flowing through a valve. When the valve is closed, the flow control member is typically configured to sealingly engage an annular or circumferential seal (e.g., a valve seat) disposed within the flow path to prevent the flow of fluid between an inlet and an outlet of the valve. Over time and with repeated use, valve components and/or actuator components can wear, resulting in various forms of failures (e.g., trim failure, packing failure, gear train wear, etc.) that can reduce the reliability of an actuator controlling the valve and/or the valve achieving a tight seal to prevent leakage.

SUMMARY

Methods and apparatus to diagnose a valve using electric valve actuators are disclosed. An example apparatus includes an electric motor to actuate a valve, rotation sensors to monitor a rotation of a drive shaft associated with the electric motor to determine a distance travelled by the drive shaft, and a valve position sensor to monitor a position of a flow control member of the valve. The example electric valve actuator further includes a processor to generate an alert based on feedback from the rotation sensors and the valve position sensor, the alert associated with a failure of the valve.

An example method disclosed herein includes monitoring a distance travelled by a drive shaft associated with an electric motor of an electric valve actuator used to operate a valve, monitoring a position of a flow control member of the valve via a valve position sensor associated with the actuator, and generating an alert based on the distance travelled by the drive shaft and the position of the flow control member, the alert associated with a failure of the valve.

Some example instructions disclosed herein, when executed, cause a machine to at least monitor a distance travelled by a drive shaft associated with an electric motor of an electric valve actuator used to operate a valve, monitor a position of a flow control member of the valve via a valve position sensor associated with the actuator, and generate an alert based on the distance travelled by the drive shaft and the position of the flow control member, the alert associated with a failure of the valve.

DETAILED DESCRIPTION

Figure 1:
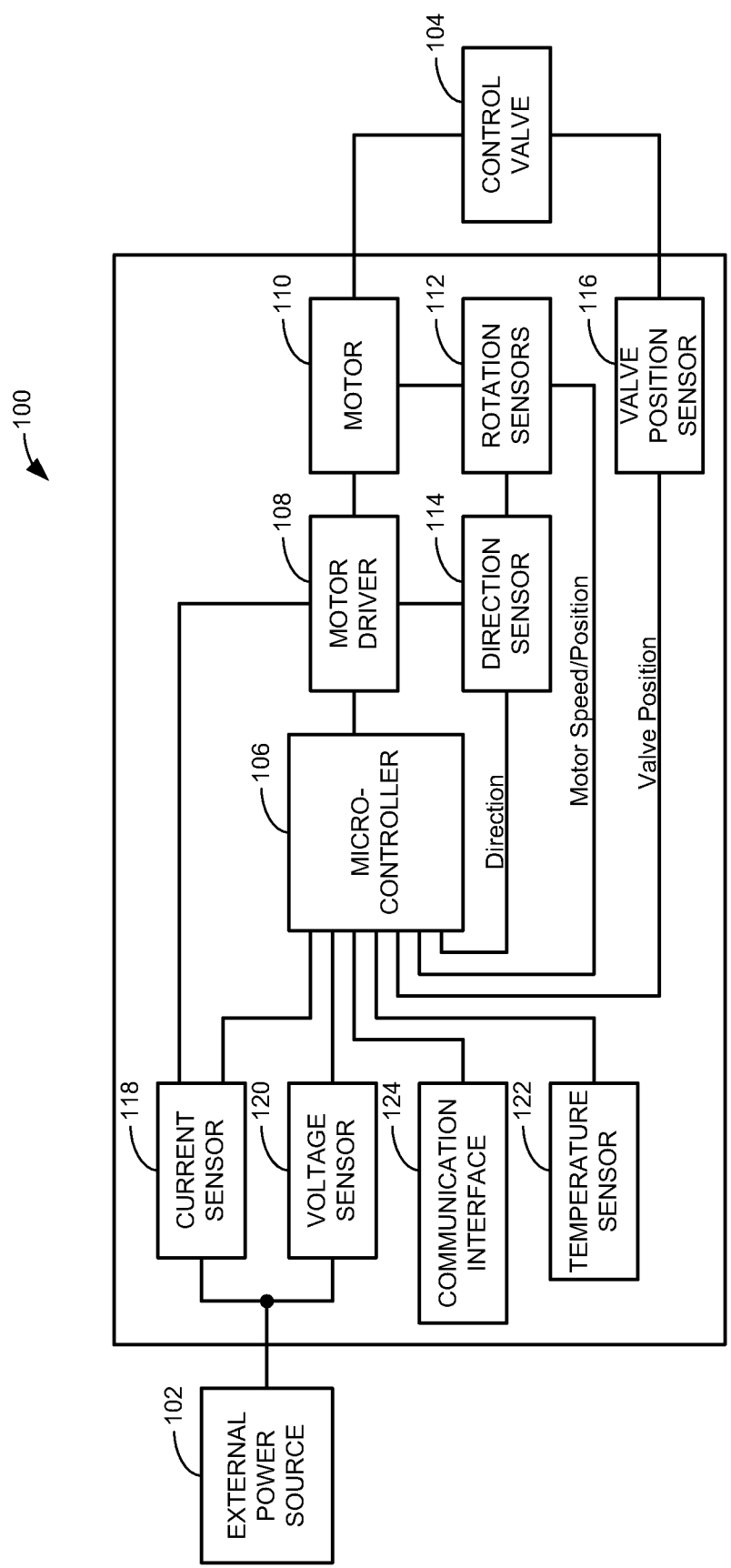
FIG. 1 is a schematic illustration of an example electric valve actuator constructed in accordance with the teachings disclosed herein.

Electric valve actuators are an effective means of closing a valve. However, when the electric motor is stopped (e.g., electric power is no longer applied), the valve may open, especially when the valve is closing off a high pressure fluid, due to the force of the process fluid pushing on the valve. In some instances, power to electric valve actuators is never shut off such that the motor within the actuator can maintain a tight seal within the valve. However, such an approach is inefficient and costly as it consumes a lot of power. As an alternative, some electric valve actuators use a spring, such as a Belleville spring or Belleville washer, to help put pressure on a valve seat to ensure the valve is closed properly, even after the motor is stopped as described in Schade et al., U.S. Pat. No. 8,408,518 issued on Apr. 2, 2013, which is incorporated herein by reference in its entirety. When closing a valve using such an internally biased actuator, once the valve stem is positioned to the 0% location (e.g., the fully closed position), the motor continues to drive the valve stem. At this point, however, the valve position no longer changes (because the valve plug is already engaging the valve seat), but the motor continues to drive the spring into full compression thereby loading the spring before power is removed to the actuator.

While electric valve actuators biased with internal loading springs as described above enable power to the actuator to be shut off, electric valve actuators still present challenges in diagnosing potential failures in both the valve itself as well as the corresponding actuator. Further, the use of an internal loading spring provides an additional source of potential failure that may confound the proper diagnosis of a failure within a valve. In particular, failures within a valve may include: (1) trim failure resulting from erosion or wear of the sealing surfaces of the valve plug and valve seat, which results in the valve not achieving its expected shutoff capability; (2) excessive trim friction, which reduces the responsiveness of the valve and may increase the stress on the actuator; (3) packing failure resulting in increased friction in the valve from wear of the packing, incompatible materials, or maladjustment of the packing; and (4) packing failure resulting in leakage (and reduced friction) from a low packing load, or from a packing that has extruded. As noted above, in addition to a valve failure, there is the possibility that the internal loading spring of the actuator may also fail either by losing its resilience and/or by breaking. Further, the gear train of the actuator may wear over time resulting in less precise control of the movement of the valve.

The teachings disclosed herein provide means to overcome the above challenges by identifying the possibility of one or more of the potential failure modes described above. Additionally, the apparatus and methods disclosed herein provide means to distinguish between the various failure modes to identify the most probable reason(s) for a failure to better assist maintenance personnel in addressing such failures.

FIG. 1 is a schematic illustration of an example electric valve actuator 100 constructed in accordance with the teachings disclosed herein. In the illustrated example, the example actuator 100 receives power from an external power source 102 to operate and monitor a control valve 104. In the illustrated example, the actuator 100 includes a processor or microcontroller 106, a motor driver 108, a motor 110, one or more rotation sensors 112, a direction sensor 114, a valve position sensor 116, a current sensor 118, a voltage sensor 120, a temperature sensor, 122, and a communication interface 124.

In the illustrated example, the microcontroller 106 receives information from one or more of the sensors 112, 114, 116, 118, 120, 122 and/or external information via the communication interface 124 to monitor and/or control the valve 104. In some examples, based on the information received, the microcontroller 106 controls the motor 110 via the motor driver 108 to move a flow control member within the valve 104. In some examples, the valve 104 is a sliding stem valve. In some such examples, the motor 110 is operatively coupled to a drive shaft via a transmission that converts rotational motion of the motor 110 to rectilinear motion of the drive shaft. In such examples, the drive shaft is coupled to the stem of the valve 104 such that movement of the motor 110 translates into movement of the flow control member. In other examples, the valve 104 is a rotary valve such that the transmission transfers the rotational motion of the motor 110 to a rotational motion of a drive shaft to correspondingly rotate a valve shaft coupled to the valve disc or other valve member to open and close the valve. Thus, although the teachings disclosed herein are primarily described in connection with a sliding stem valve, the teachings may also be applied to rotary valves.

In some examples, the transmission and drive shaft of the motor 110 are manufactured with tight tolerances levels to precisely control a distance travelled by the drive shaft in the linear direction for a corresponding number of rotations of the drive shaft. In some examples, the actuator 100 is provided with the rotation sensors 112 to monitor the rotation of the drive shaft. In some examples, the rotation sensors 112 are implemented with non-contacting sensors such as, for example, Hall-effect sensors, an optical encoder, etc. In particular, in some examples where the rotation sensors 112 include Hall-effect sensors, the drive shaft of the motor 110 is provided with one or more magnets distributed around the circumference of the shaft. As each magnet passes the rotation sensors 112 a signal or pulse is produced indicating the rotation of the drive shaft. The number of rotation sensors 112 and the number of magnets distributed around the drive shaft determines the resolution with which the movement of the drive shaft (and corresponding flow control member within the valve 104) may be monitored. For instance, in some examples, the actuator 100 includes three rotation sensors and the drive shaft includes 10 magnets. In such examples, one full rotation of the shaft corresponds to 30 (3×10) pulses received from the rotation sensors 112. Assuming that one complete rotation of the drive shaft corresponds to 0.3 inches of linear movement of the drive shaft, the example actuator 100 can control or monitor the movement of the flow control member within the valve 104 within 0.01 inches (0.3 inches/rotation÷30 pulses/rotation). Furthermore, the speed at which the motor 110 is rotating can also be monitored based on the rate at which the pulses are received (based on the magnets passing the rotation sensors 112). Additionally or alternatively, in some examples, the rotation sensors 112 may be positioned to detect corresponding magnets at other locations within the transmission of the motor 110. In such examples, the corresponding distance travelled by the drive shaft is determined in the same way described above except that any gear ratios are taken into account. Further, the example actuator 100 is provided with the direction sensor 114 to detect the direction that the drive shaft is rotating, thereby indicating the direction in which the drive shaft is traveling and, therefore, the direction that the flow control member within the valve 104 is moving.

By monitoring the distance (and direction) travelled by the drive shaft of the motor 110 via the rotation sensors 112 as described above, the position of the valve 104 (i.e., the position of the flow control member within the valve 104) can be inferred. For example, the position of the valve 104 can be inferred based on the number of pulses received as the motor 110 moves the flow control member from a reference location to the position of interest. In some examples, the reference location corresponds to the valve 104 in a fully open position. In such examples, the number of pulses received via the rotation sensors 112 as the drive shaft closes the valve 104 from the fully open position can be used to determine the distance travelled by the drive shaft and, thus, the distance the flow control member of the valve 104 has moved closed. Similarly, in some examples, the reference location corresponds to a position of the motor 110 when it stalls while moving the flow control member to the closed position. In some examples, the motor 110 stalls when the valve 104 reaches a fully closed position because a mechanical stop results when the valve plug meets the valve seat. In such examples, the position of the flow control member can be inferred by determining a distance travelled by the drive shaft from the motor stall position based on the number of pulses received via the rotation sensors 112 as the valve 104 opens from the fully closed position.

In other examples, the actuator 100 is provided with an internal loading spring or biasing element to bias the valve 104 when power is removed from the example actuator 100. In some examples, the internal loading spring comprises a Belleville spring or Belleville washer. In some such examples, the drive shaft of the motor 110 moves the flow control member within the valve 104 until it is fully closed and then continues moving in the same direction past the fully closed position of the valve 104 to load the internal loading spring. Accordingly, in such examples, the point at which the motor 110 stalls corresponds to the point at which the internal loading spring is fully compressed or otherwise fully loaded (e.g., the biasing force from the loading spring equals the force generated by the motor 110). As the drive shaft of the motor 110 moves when loading the spring while the flow control member of the valve 104 remains stationary in the fully closed position, the position of the flow control member cannot be directly inferred based on the distance travelled by the drive shaft (e.g., based on pulses from the rotation sensors 112) from the reference location corresponding to the stall position of the motor 110. However, in some examples, the distance travelled by the drive shaft from the fully closed position of the valve to the stall position of the motor 110 (i.e., the distance travelled to fully load the internal loading spring) remains constant over time. Accordingly, in such examples, the position of the flow control member of the valve 104 can be inferred based on the distance travelled by the drive shaft from the reference location (i.e., the stall position) less the fixed distance during which the drive shaft is acting on the internal loading spring.

In the illustrated example of FIG. 1, the actuator 100 is also provided with the valve position sensor 116. In some examples, the valve position sensor 116 is configured to directly measure the position of the flow control member within the valve 104, rather than inferring valve movement based on the distance traveled by the drive shaft as determined by the number of pulses received via the rotation sensors 112. Accordingly, in some examples, the valve position sensor 116 provides redundancy in determining the position of the valve 104 (i.e., the position of the corresponding flow control member). Additionally or alternatively, the valve position sensor 116 and the rotation sensors 112 may be used cooperatively to diagnose potential failures in the valve 104.

Figure 2:
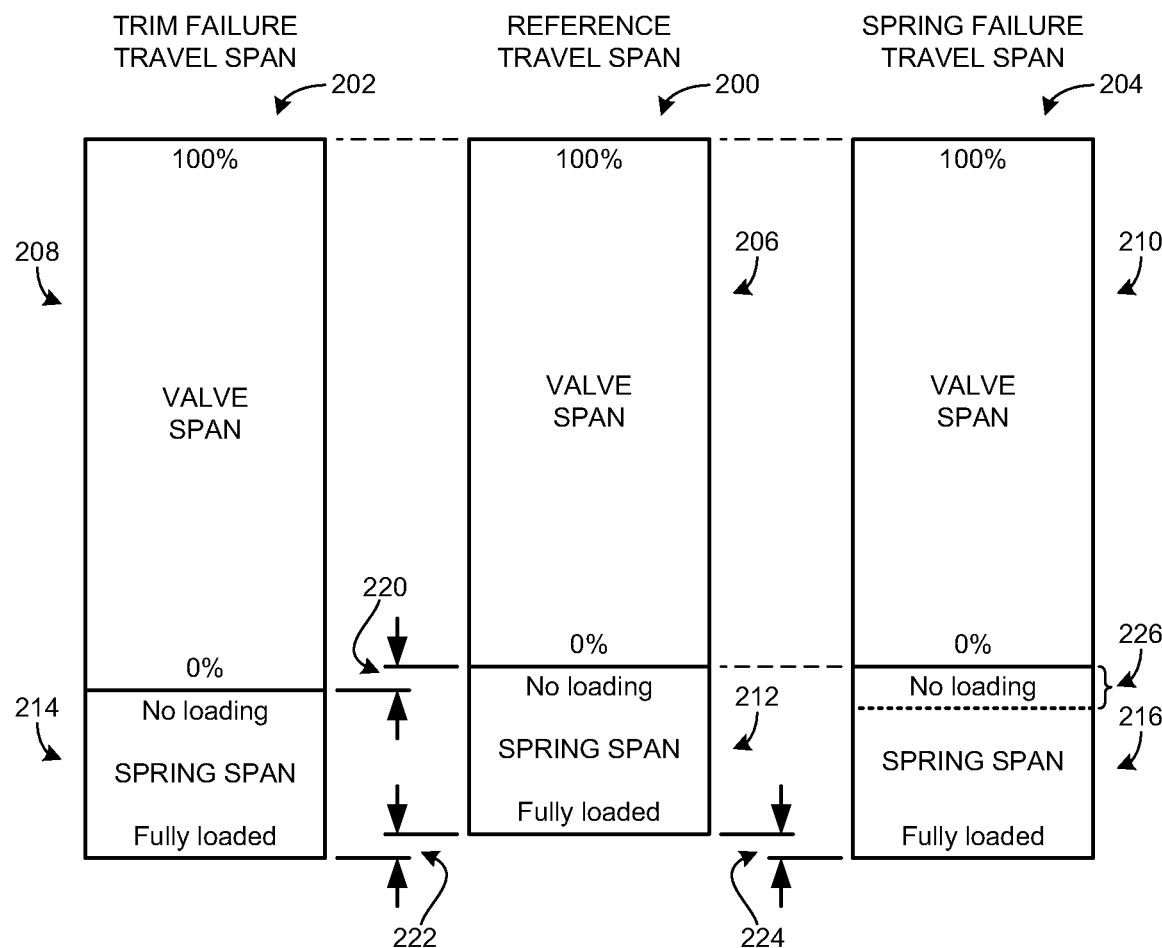
FIG. 2 is a diagram representative of example travel spans for a drive shaft of the example actuator of FIG. 1 operating a valve.

FIG. 2 is a diagram representative of example travel spans 200, 202, 204 for a drive shaft of the example actuator 100 of FIG. 1 operating a valve (e.g., the valve 104 of FIG. 1). In particular, FIG. 2 provides an example reference travel span 200 corresponding to the actuator 100 and valve 104 operating under normal conditions (e.g., at the time of manufacture when the valve 104 is first assembled and calibrated prior to the onset of any failure conditions). The reference travel span 200 and associated distances described more fully below may be used as a reference or baseline for comparison with the operation of the valve 104 over time to identify potential failures based on changes in the distance measured for the travel spans. FIG. 2 provides an example trim failure travel span 202 corresponding to one form of potential failure based on erosion or wear on the mating surfaces between the valve plug and valve seat. FIG. 2 also provides an example spring failure travel span 204 corresponding to another form or failure based on a weakening or breaking of the internal loading spring of the actuator 100. Each of the travel spans 200, 202, 204 includes a corresponding valve span 206, 208, 210 representative of the distance travelled by the valve 104 between a fully open position (e.g., 100%) and a fully closed position (e.g., 0%) sometimes referred to as the zero position corresponding to the point at which the flow control member within the valve 104 can no longer move in the closing direction. Additionally, as shown in the illustrated example, each of the travel spans 200, 202, 204 includes a corresponding spring span 212, 214, 216 representative of the distance travelled by the drive shaft between the fully closed position of the valve (e.g., when the internal loading spring is uncompressed or without any loading) and the point when the motor 110 stalls (e.g., when the internal loading spring is fully loaded). In examples where the actuator 100 does not include the internal loading spring, the spring failure travel span 204 and the reference and trim failure travel spans 200, 202 would only include the corresponding valve span 206, 208 such that the stall position of the motor 110 would correspond to the fully closed position of the valve 104.

In some examples, a span of the valve 104 (e.g., the distance between the fully open position and the fully closed position) is determined at the time of manufacture and the resulting distance relative to a reference location is stored as a reference distance against which the distance travelled by the valve 104 (indirectly inferred via the distance travelled by the drive shaft) can be compared over the life of the valve 104 to identify potential trim failure (e.g., erosion of the valve plug and/or valve seat along the surfaces where the plug and seat mate). For example, as trim erosion occurs and the valve plug and/or valve seat wear, a small gap develops between the valve plug and the valve seat such that the valve plug travels farther before hitting the hard stop of the valve seat to fully close the valve 104. As a result, there is a difference 220 between the reference distance defined by the original valve span 206 determined at the time of manufacture and the measured distance defined by the valve span 208 after the trim has worn from repeated use.

Additionally or alternatively, in some examples, the position of the valve 104 (i.e., the position of the flow control member within the valve 104) when fully closed is inferred from the distance travelled by the drive shaft through the spring span relative to the reference location of the stall position of the motor 110 (e.g., after travelling through the full spring span). In particular, the spring span (i.e., the distance the drive shaft must travel to fully load the internal loading spring) is independent of the valve span or any associated trim failure because the drive shaft will not begin loading the internal loading spring until the flow control member within the valve 104 has stopped moving (i.e., has reached the fully closed position). That is, as described above, the spring span is assumed to be constant over time such that any change in the position of the flow control member in the fully closed position due to trim wear (e.g., the difference 220 between the fully closed position on the valve span 206 and the valve span 208) results in a corresponding difference 222 between the total reference travel span 200 and the trim failure travel span 202. Put another way, as represented in the illustrated example, the spring span 212 of the reference travel span 200 is equivalent in length to the spring span 214 of the trim failure travel span 202. Accordingly, when operating a valve with trim failure, once the motor 110 stalls, the constant distance corresponding to the spring span can be subtracted from the overall distance of the trim failure travel span 202 to infer the position of the valve 104 when fully closed. The resulting position of the valve 104 can be compared to the expected or reference position of the value 104 in the fully closed position at the time of manufacture (e.g., corresponding to the reference travel span 200) to determine the difference 220. In some examples, the position of the valve 104 and/or the corresponding distances traveled are based on the number of pulses measured by the rotation sensors 112 and the corresponding time to load the spring of the actuator 100. Thus, as shown in the illustrated example, the number of pulses and time to load the spring during a trim failure is the same as the number of pulses and time to load the spring under normal conditions except that the pulses and time will be slightly shifted relative to the reference travel span 200. In some examples, the current drawn by the motor 110 follows the same profile (described more fully below in connection with FIGS. 3-5) with respect to both the reference travel span 200 and the trim failure travel span 202. In some examples, when the difference 220 (or corresponding difference 222) exceeds a certain threshold (e.g., an absolute distance and/or a percentage of the total valve span), an alarm or alert may be tripped to inform an operator, engineer, or other plant personnel of a potential trim failure.

In some examples, rather than determining the position of the flow control member of the valve 104 based on the distance travelled by the drive shaft, the difference 220 is determined based on a directly measured position of the flow control member when the valve 104 is fully closed. In particular, the difference 220 corresponds to a difference between the measured position of the flow control member and an expected position of the flow control member based on a reference position of the flow control member corresponding to the fully closed position of the valve 104 determined at the time of manufacture (e.g., before the onset of trim wear). In some examples, the position of the valve 104 when fully closed is determined directly via the valve position sensor 116 of the example actuator 100. For instance, regardless of whether there is trim wear, the valve position sensor 116 may detect when the valve plug hits the hard stop of valve seat because the flow control member stops moving and, thereby, detect when the valve 104 is fully closed.

In some examples, the internal loading spring of the example actuator 100 may begin failing (e.g., begin losing its resilience) and/or break. When such spring failure has occurred, the internal loading spring has less ability (e.g., due to weakened resilience) or no ability (e.g., due to a broken spring) to push against the drive shaft and provide the desired biasing force. Accordingly, in some such examples, the motor 110 can compress the spring a greater distance than normal before the motor 110 stalls as illustrated by a difference 224 between the spring span 212 of the reference travel span 200 and the spring span 216 of the spring failure travel span 204. In some such examples, the spring span 216, as illustrated in FIG. 2, includes a no load region 226 where the motor 110 will move after the valve stem reaches the fully closed position (e.g., the 0% location) a certain distance before beginning to compress or load the spring because of a spring failure. In some examples, the distance traveled by the motor 110 through the no load region 226 is different than the difference 224 of the spring span 216 of the spring failure travel span 204 relative to the reference travel span 200. Thus, in some examples, the actual travel span of the motor 110 while loading the spring may be less than the spring span 212 of the reference travel span 200, the overall spring span 216 is greater than the spring span 212 because the additional distance travelled by the motor 110 during the no load region 226. In other examples, the internal loading spring may fail such that the drive shaft cannot compress the spring as far resulting in a shortened spring span. In some examples, when the difference 224 exceeds a certain threshold, an alarm or alert may be tripped to inform an operator, engineer, or other plant personnel of the detected spring failure. In some examples, the above scenarios of changes to the spring span 216 relative to the reference spring span 212 may be identified by changes to the current profile (e.g., such as a shift in time) as drawn by the motor 110 as it travels along the spring failure travel span 204. Example current profiles are described in greater detail below in connection with FIGS. 3-5, As shown in FIG. 2, the total length of the trim failure travel span 202 and the spring failure travel span 204 are each longer than the reference travel span 200 by the corresponding difference 222, 224. Although the differences 222, 224 corresponding to each of the failure travel spans 202, 204 are represented as having the same length in FIG. 2, this is not necessarily the case. Rather, because the failures and resulting change to the corresponding travel spans 202, 204 are independent, the differences 222, 224 may correspond to different lengths. Furthermore, it is possible that there is a spring failure and a trim failure such that the difference between the total travel span of the valve 104 relative to the reference travel span 200 is a combination of the differences 222, 224. A spring failure and a trim failure may result in an overall increase in the length of the corresponding travel span. Thus, these failures cannot be distinguished from each other when relying solely on the distance travelled by the drive shaft measured via the rotation sensors 112. Therefore, in some examples, when a change in the travel span is detected, the alert may indicate that the possibility that at least one of a spring failure or a trim failure has occurred and the plant personnel may investigate further and take suitable corrective action. However, trim failure typically occurs gradually over time as the valve components erode and/or wear such that the difference 222 gradually increases until the difference 222 exceeds a predetermined threshold. In contrast, a spring failure, such as a broken spring, may occur suddenly such that from one stroke of the valve 104 to the next stroke the difference 224 may include a substantial change. Accordingly, in some examples, the difference between the distance travelled by the drive shaft along the reference travel span 200 and the trim or spring failure travel spans 202, 204 is monitored over time during successive strokes of the valve 104. In such examples, if the difference increases gradually, the alert indicates a trim failure, whereas if the difference increases suddenly between successive strokes, the alert indicates a spring failure. While the ability to distinguish the failure modes in this manner is possible based solely on feedback from the rotation sensors 112, such a technique is not without limitation as trim wear may have occurred prior to the sudden failure of the spring but, as a result of the spring failure, go undetected because the trim wear had not yet reached the threshold.

In some examples, confusion between trim failure and spring failure is avoided through the valve position sensor 116, which can directly determine when the valve 104 reaches the fully closed position (e.g., based on when the flow control member within the valve stops moving when being closed) to thereby detect any potential trim failure. While trim failure can be detected relying solely on the valve position sensor 116, the valve position sensor 116 cannot detect a spring failure in the actuator 100. Accordingly, in some examples, the rotation sensors 112 and the valve position sensor 116 are used cooperatively to detect when either a trim failure or a spring failure has occurred and to distinguish when one, the other, or both are at issue.

Returning to FIG. 1, the example actuator 100 is provided with the current sensor 118 and the voltage sensor 120 to monitor the power used to operate the motor 110 to provide an additional or alternative means of detecting failures in the valve 104. The amount of current drawn by the motor 110 to turn the drive shaft is dependent upon the speed of the motor 110, the pressure of fluid within the valve 104, internal friction within the valve (e.g., trim friction or packing friction) when moving the flow control member, and/or the biasing force of the internal loading spring when loading the spring (e.g., when the valve 104 is in the fully closed position). In some examples, the speed of the motor 110 is set by the microcontroller 106 and, thus, is known. However, in some examples, the amount of current that can be drawn by the motor 110 is capped as a safety measure such that the speed of the motor 110 may be slower than what is defined by the microcontroller 106 if the demands for current are too high. In some such examples, the reduced speed is detected by comparing the motor speed dictated by the microcontroller 106 with the actual speed of the drive shaft measured via the rotation sensors 112 as described above. In addition to the speed of the motor 110, in some examples, the pressure of fluid in the valve 104 is also known based on a direct measurement via a pressure sensor in communication with the actuator 100 via the communication interface 124. Accordingly, in some examples, by monitoring the current drawn by the motor 110 as determined by the current sensor 118 at a known speed and a known pressure, the effects of internal friction when moving the flow control member and/or the biasing force when loading the internal loading spring can be analyzed for potential failures. In particular, in some examples, the measured current can be compared to a reference current based on an anticipated or expected current under normal operating conditions (e.g., as determined at the time of manufacture prior to the onset of any failure conditions). In such examples, the resulting difference between the measured current and the reference current is indicative of certain failures such as a packing failure (including packing wear, packing maladjustment, or a low packing load), excess trim friction (e.g., due to trim wear), and/or failure of the internal loading spring. In some examples, when such a difference in current is detected an alert or alarm is tripped to inform an operator or other personnel to take appropriate action.

Typically, there will be some variability in the measured current while the motor 110 is moving due to imperfections in the machining and/or alignment of the components in the gear train of the actuator 100. Additionally, over time there will be wear to the gear train in the actuator 100 (e.g., binding and/or galling) that may increase the variability in the current drawn by the motor 110. Accordingly, in some examples, to account for normal (e.g., expected) variability, the alert or alarm indicating a potential failure may not be tripped until the difference between the measured current and the reference current exceeds a predetermined threshold. Further, in some examples, the variability of the current is monitored such that when the variability becomes more pronounced a separate alarm and/or alert may be tripped to indicate wear in the actuator 100 and/or to provide information regarding how much longer the actuator 100 will continue to operate under the given operating conditions.

Figure 3:
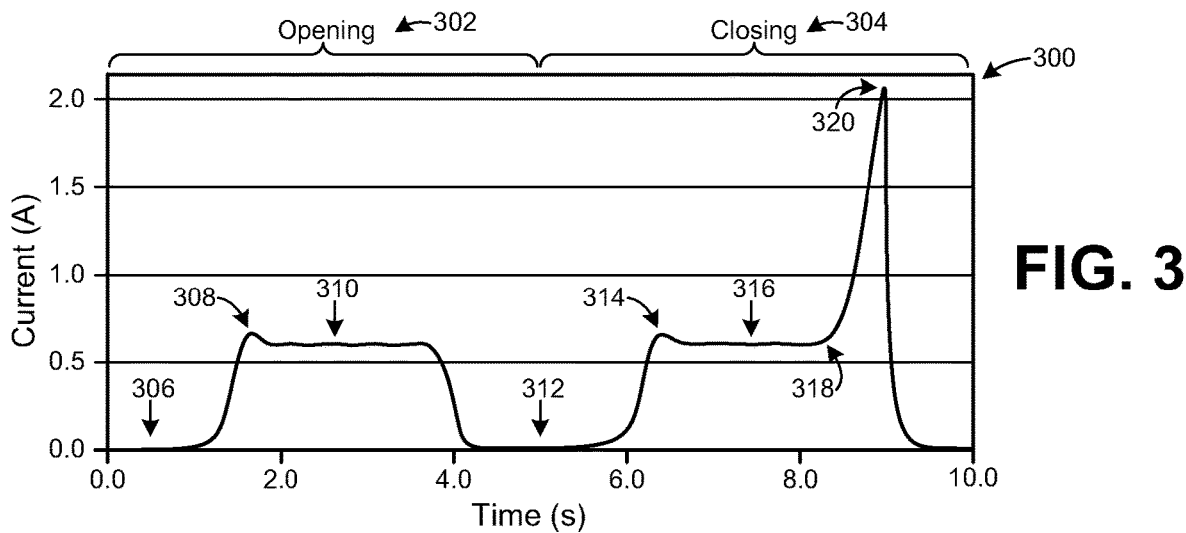
FIG. 3 is an example reference current profile for an unpressurized valve being opened and closed.
Figure 4:
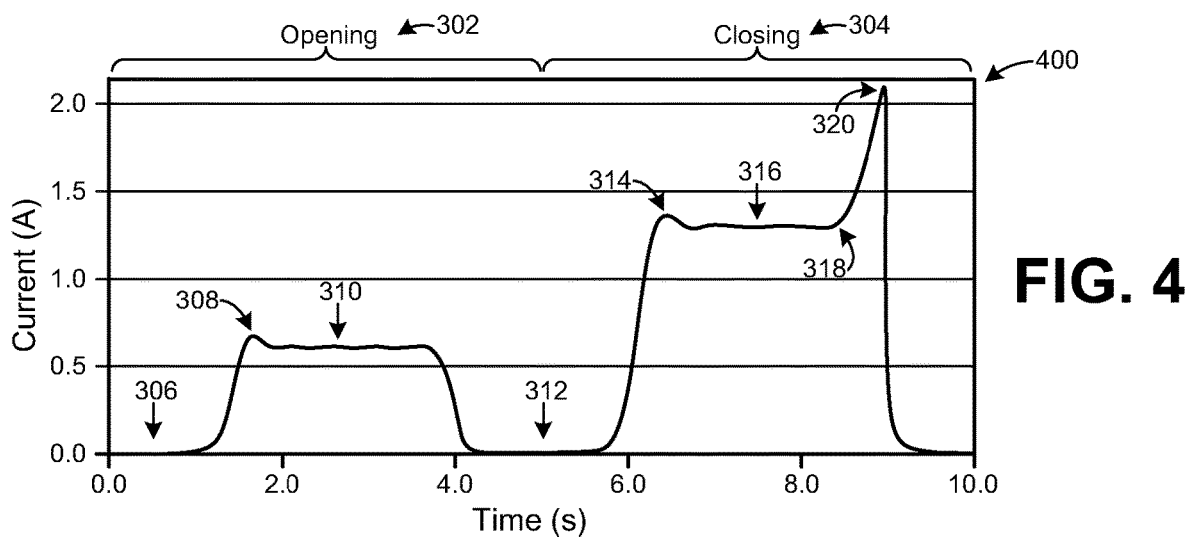
FIG. 4 is an example reference current profile for a pressurized valve being opened and closed.
Figure 5:
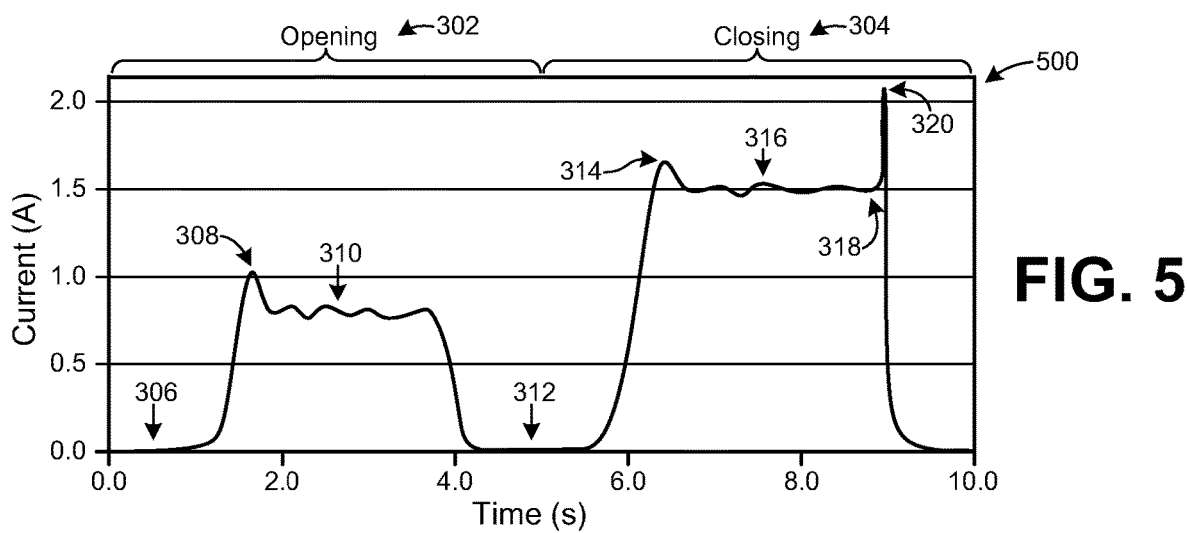
FIG. 5 is an example measured current profile of a valve exhibiting potential failures to be compared against the example reference profiles of FIGS. 3 and 4.

In some examples, the reference current is based on an expected curve or profile of current over time corresponding to the valve 104 being opened and/or closed during normal operation (e.g., without the presence of failure conditions). For example, FIGS. 3-5 illustrate example current profiles 300, 400, 500 corresponding to the opening and closing of a valve (e.g., the valve 104) under different circumstances. More particularly, FIGS. 3 and 4 illustrate example reference current profiles 300, 400 corresponding to a valve operating normally (e.g., prior to the onset of packing failure or trim failure). The reference current profile 300 corresponds to the valve operating when unpressurized (e.g., operating at atmospheric pressure) and the reference current profile 400 corresponds to the valve operating when pressurized (e.g., at 2250 psi). FIG. 5 illustrates an example measured current profile 500 correspond to the valve operating at the same pressure as in FIG. 4 (e.g., at 2250 psi) after experiencing a failure.

In some examples, the reference current profiles 300, 400 are generated for the valve 104 at the time of manufacture of the valve 104. In this manner, the resulting current profiles 300, 400 provide expected values for the current while stroking the valve prior to the onset of wear or erosion to any associated components to serve as a baseline for comparison with the current drawn by the actuator 100 opening the valve 104 in the field. The measured current profile 500 of FIG. 5 is representative of a potential profile that may result after the valve 104 has been used repeatedly and begun to wear.

As shown in the illustrated examples, the current profiles 300, 400, 500 are composed of an opening time span 302 and a closing time span 304 corresponding to the opening and closing of the valve 104 over a period of approximately 10 seconds. More particularly, after an initial pause 306, the current as shown in each of the current profiles 300, 400, 500 begins rising at around one elapsed second and quickly reaches a peak 308 corresponding to the point at which the valve 104 initially begins to open. During an opening period 310, the current remains approximately constant until the valve 104 reaches the fully open position at around four elapsed seconds, at which point the current drops for a second pause 312 during the transition to the closing time span 304. At around six elapsed seconds, in the illustrated examples, the current begins to rise until it reaches a second peak 314 corresponding to the point at which the valve 104 initially begins to close. As shown in the example current profiles 300, 400, 500, the current remains approximately constant during a closing period 316 and then suddenly ramps up at a closure point 318 corresponding to when the valve 104 reaches a fully closed position and the motor 110 begins acting on the internal loading spring of the actuator 100. Accordingly, in some examples, the current sensor 118 is used as an alternative and/or additional measure of when the valve 104 is fully closed as described above in connection with FIG. 2. Further, as shown in the illustrated examples, in each of the current profiles 300, 400, 500 the current reaches a peak 320 before dropping as the internal loading spring becomes fully loaded and the motor 110 stalls. In some examples, the motor 110 is configured to stall at a specified current limit (e.g., 2.1 amps in the illustrated examples). Accordingly, as the internal loading spring is loaded by the motor 110 the biasing force of the internal loading spring increases until the force matches the force of the motor 110 at the predetermined stall current (e.g., 2.1 amps) at which point the motor 110 is shut off (e.g., stalls). In this manner, the stall position of the motor 110 at the end of the spring span described above in connection with FIG. 2 (e.g., corresponding to when the internal loading spring is fully loaded) may be identified based on the peak 320.

The example reference current profile 400 of FIG. 4 is similar to the example reference current profile 300 of FIG. 3 except that the amount of current drawn during the closing period 316 is higher in the reference current profile 400 associated with a pressurized valve as compared with the reference current profile 300 associated with an unpressurized valve. In particular, as shown in the illustrated examples, when the valve 104 is unpressurized (FIG. 3) the amount of current drawn by the motor 110 during the opening period 310 is approximately the same as the current drawn during the closing period 316, which in the current profile 300 of FIG. 3 is around 0.6 amps. In contrast, when the valve 104 is pressurized, although the current drawn by the motor 110 during the opening period 310 is approximately the same as in FIG. 3 (e.g., about 0.6 amps), the current drawn during the closing period 316 is significantly higher (e.g., about 1.3 amps) as shown in FIG. 4. As the pressure in the valve 104 increases the current drawn by the motor 110 increases because the motor 110 must overcome the force of the fluid in the valve 104 to close the valve 104. Accordingly, in some examples, the valve 104 is tested over a range of pressures at the time of manufacture (e.g., before the onset of failure conditions) to determine a reference current that is expected when closing the valve 104 at each of the tested pressures during the closing period 316. In some examples, the range of pressures tested may be used as data points to extrapolate an expected or reference current to be drawn by the motor 110 of the example actuator 100 during the closing period 316 for any pressure level within the valve 104.

In some examples, as the current sensor 118 monitors the current drawn by the motor 110 of the actuator 100 to move the flow control member of the valve 104 operating in the field, the microcontroller 106 compares the measured current to the reference current based on the expected current profile corresponding to the pressure of fluid in the valve 104 operating in the field. In some examples, a difference between the measured current and the reference current during the opening and/or closing periods 310, 316 may indicate a potential failure of the valve 104. For example, although the same valve 104 may be operated at the same pressure in both FIGS. 4 and 5, the amount of the current drawn in the opening period 310 of the measured current profile 500 is higher than the corresponding reference current (e.g., around 0.8 amps in FIG. 5 compared with 0.6 amps in FIG. 4). Similarly, the current drawn during the closing period 316 of FIG. 5 is higher than during the closing period 316 of FIG. 4 (e.g., around 1.5 amps in FIG. 5 compared with 1.3 amps in FIG. 4). Inasmuch as FIGS. 4 and 5 correspond to the valve 104 operating at the same pressure and the same speed, the difference in the current drawn by the motor 110 in FIG. 5 can be identified as stemming from a failure in the valve 104. For example, a higher current than expected is indicative of increased friction within the valve 104 such that the motor 110 needs additional power to overcome the related increased resistive forces. Such increased friction may arise from packing wear, packing maladjustment, and/or excess trim friction. Additionally or alternatively, in some examples, the increased current required of the motor 110 may arise from wear to the gear train of the actuator 100. Accordingly, in some examples, where the current drawn by the motor 110 is higher than the reference current (as shown in FIG. 5), an alarm or alert may be tripped to inform plant personnel of the possibility of at least one of the three above-mentioned valve failures and/or actuator gear train wear having occurred. In contrast, a measured current that is lower than the reference current is indicative of less friction in the valve 104 that the motor 110 must overcome to move the flow control member within the valve, which may arise when there is a low packing load in the valve. Accordingly, in some examples, where the current drawn by the motor 110 is lower than the reference current, the alert may indicate a low packing load. As described above, in the illustrated example, the motor 110 is configured to stall when the current the motor 110 is drawing reaches 2.1 amps. Accordingly, in some examples, the actuator 100 is limited to an upper fluid pressure associated with the valve 104 such that the current drawn during the closing period 316 is sufficiently below the current limit (e.g., 2.1 amps) so that the motor 110 does not stall while closing the valve 104. However, in some instances, internal friction built up within the valve 104 may increase the current drawn by the motor 110 such that the motor 110 may stall before fully closing the valve 104. In some examples, when the motor 110 stalls is indicated by a drop in voltage as monitored by the voltage sensor 120. Accordingly, in some examples, the voltage monitored by the voltage sensor 120 is used to dynamically increase and/or decrease the current limit for the motor 110 to determine the level of obstruction in the valve 104 while moving the valve plug As shown in the illustrated examples, the amount of the current drawn during the opening and closing periods 310, 316 is not a precise number. Accordingly, in some examples, the measured current and the reference current are based on an average value of the current during the corresponding periods 310, 316. Furthermore, to account for normal variation in the current value, in some examples, a difference between the measured current and reference current only causes an alert when the difference exceeds a predefined threshold. In some examples, the threshold may be different for a current that is above an expected value (e.g., indicative of packing wear, packing maladjustment, and excess trim friction) relative to a current that is below the expected values (e.g., indicative of a low packing load).

In some examples, a trim failure is detected by comparing the peaks 308, 314 corresponding to when the flow control member within the valve begins moving from either a fully closed position or a fully open position. As shown in the illustrated examples, the measured current profile 500 of FIG. 5 includes peaks 308, 314 that rise significantly higher than the corresponding peaks 308, 314 of the reference current profile 400 of FIG. 4. For example, as illustrated in FIG. 4, the peaks 308, 314 reach a current of about 0.7 amps and 1.3 amps respectively, whereas the peaks 308, 314 of FIG. 5 reach a current of about 1.0 amp and 2.0 amps respectively. In some such examples, when the difference between the measured current (FIG. 5) and the reference current at the corresponding peaks 308, 314 exceeds a threshold, an alert is tripped to indicate potential trim failure. As described above, the current during the opening and closing periods 310, 316 may also vary between the measured current and the reference current. Thus, in some examples, the values used for comparison at the peaks 308, 316 are normalized by calculating a current peak height corresponding to the difference between the maximum amount of current drawn at the peaks 308, 316 and the average current drawn during the corresponding opening or closing period 310, 316 for both the measured and reference current. For example, the peaks 308, 314 of FIG. 4 are approximately 0.1 amps higher than during the corresponding opening and closing periods 310, 316 for a current peak height at each of the peaks 308, 314 of 0.1. In contrast, the peaks 308, 314 of FIG. 5 are approximately 0.2 amps higher than during the corresponding opening and closing periods 310, 316 for a current peak height at each of the peaks 308, 314 of 0.2. In some examples, an alert is tripped based on the difference between the current peak height of the measured current and the current peak height of the reference current.

In addition to some expected variability in the measured current, in some examples, where there is effects of wear in the gear train of the actuator 100, the variability may be more pronounced or manifest. For example, while the opening and closing periods 310, 316 of the reference current profiles 300, 400 are associated with a substantially constant current (e.g., minimal variability), the current drawn by the motor 110 during the opening and closing periods 310, 316 of the reference current profile 500 includes significantly more variation. Accordingly, in some examples, the variability of the measured current is compared relative to the variability of the reference current and an alert indicating potential wear of the gear train is tripped when the difference exceeds a threshold.

Additionally or alternatively, in some examples, the measured current profile 500 is compared to the reference current profile 400 to diagnose failure of the internal loading spring within the actuator 100. For example, as described above, each of the current profiles 300, 400, 500 has a distinctive closure point 318 indicative of the point at which the valve 104 is fully closed and any additional movement by the motor 110 of the actuator 100 loads (e.g., compresses) the internal loading spring. As shown in the example current profiles 300, 400 of FIGS. 3 and 4, as the spring is loaded, the current drawn by the motor 110 ramps up to overcome the increasing force of the spring until it reaches the peak 320, which is indicative of the internal loading spring being fully loaded. In some examples, a fully loaded spring corresponds to the point at which the motor 110 stalls (e.g., the force of the internal loading spring equals the force of the motor 110 at the current limit set for the actuator 100). As shown in FIG. 5, the measured current profile 500 suddenly spikes at the closure point 318 up to the peak 320 instead of ramping up to the stall position (e.g., at peak 320) in the same way as shown in the reference current profiles 300, 400, thereby indicating that the internal loading spring is not being properly loaded due to a failure of the spring. Accordingly, in some examples, when the measured current along the current profile between the closure point 318 and the peak 320 is different than a reference current at the peak 320, an alert is tripped to indicate a spring failure. In some examples, the alert is only tripped if the difference exceeds a predefined threshold.

The current profiles 300, 400, 500 of the illustrated examples are shown by way of example only for purposes of explanation and are not intended to indicate the precise values and/or timing of the current drawn while stroking a valve. Rather, the amount of current drawn by the motor 110 may vary based on a number of factors including a size of a valve coupled to the motor, the speed at which the valve is actuated, the control strategy that defines when the valve is to actuated, the location to which the flow control member of the valve is to move, and the pressure within the valve.

Returning to FIG. 1, the example actuator 100 is further provided with the temperature sensor 122 to monitor the temperature of the actuator 100. In some instances, the temperature of the actuator 100 impacts the current drawn by the motor 110. For example, the motor 110 may operate more efficiently at lower temperatures but lower temperatures can increase the viscosity of the lubricating grease in the system and, therefore, the friction forces to be overcome by the motor 110. Accordingly, in some examples, the temperature of the actuator 100 is taken into account when comparing the measured current drawn by the motor 110 to the reference current. For instance, in some examples, the relationship between actuator temperature and current is used to adjust the baseline current values associated with the reference current. Additionally or alternatively, in some examples, the threshold between the reference current and the measured current is adjusted based on variations in the temperature to account for any expected variation between the reference and measured values before and alert is tripped.

Furthermore, as shown in the illustrated example, the actuator 100 includes the communication interface 124 to enable the actuator 100 to communicate with other components in a process control system and/or with plant personnel. For instance, in some examples, it is via the communication interface 124 that any of the alerts described above may be communicated to plant personnel. Additionally, in some examples, the actuator 100 communicates with a pressure sensor via the communication interface 124 to obtain real time measurements of the pressure associated with the valve 104 to determine the corresponding reference current to compare against the measured current as described above in connection with FIGS. 3-5.

While an example manner of implementing the example actuator 100 is illustrated in FIG. 1, one or more of the elements, processes and/or devices illustrated in FIG. 1 may be combined, divided, re-arranged, omitted, eliminated and/or implemented in any other way. Further, the example microcontroller 106, the example motor driver 108, the example motor 110, the example rotation sensors 112, the example direction sensor 114, the example valve position sensor 116, the example current sensor 118, the example voltage sensor 120, the example temperature sensor, 122, the example communication interface 124, and/or, more generally, the example actuator 100 of FIG. 1 may be implemented by hardware, software, firmware and/or any combination of hardware, software and/or firmware. Thus, for example, any of the example microcontroller 106, the example motor driver 108, the example motor 110, the example rotation sensors 112, the example direction sensor 114, the example valve position sensor 116, the example current sensor 118, the example voltage sensor 120, the example temperature sensor, 122, the example communication interface 124, and/or, more generally, the example actuator 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example microcontroller 106, the example motor driver 108, the example motor 110, the example rotation sensors 112, the example direction sensor 114, the example valve position sensor 116, the example current sensor 118, the example voltage sensor 120, the example temperature sensor, 122, and/or the example communication interface 124, is/are hereby expressly defined to include a tangible computer readable storage device or storage disk such as a memory, a digital versatile disk (DVD), a compact disk (CD), a Blu-ray disk, etc. storing the software and/or firmware. Further still, the example actuator 100 may include one or more elements, processes and/or devices in addition to, or instead of, those illustrated in FIG. 1, and/or may include more than one of any or all of the illustrated elements, processes and devices.

Figure 6:
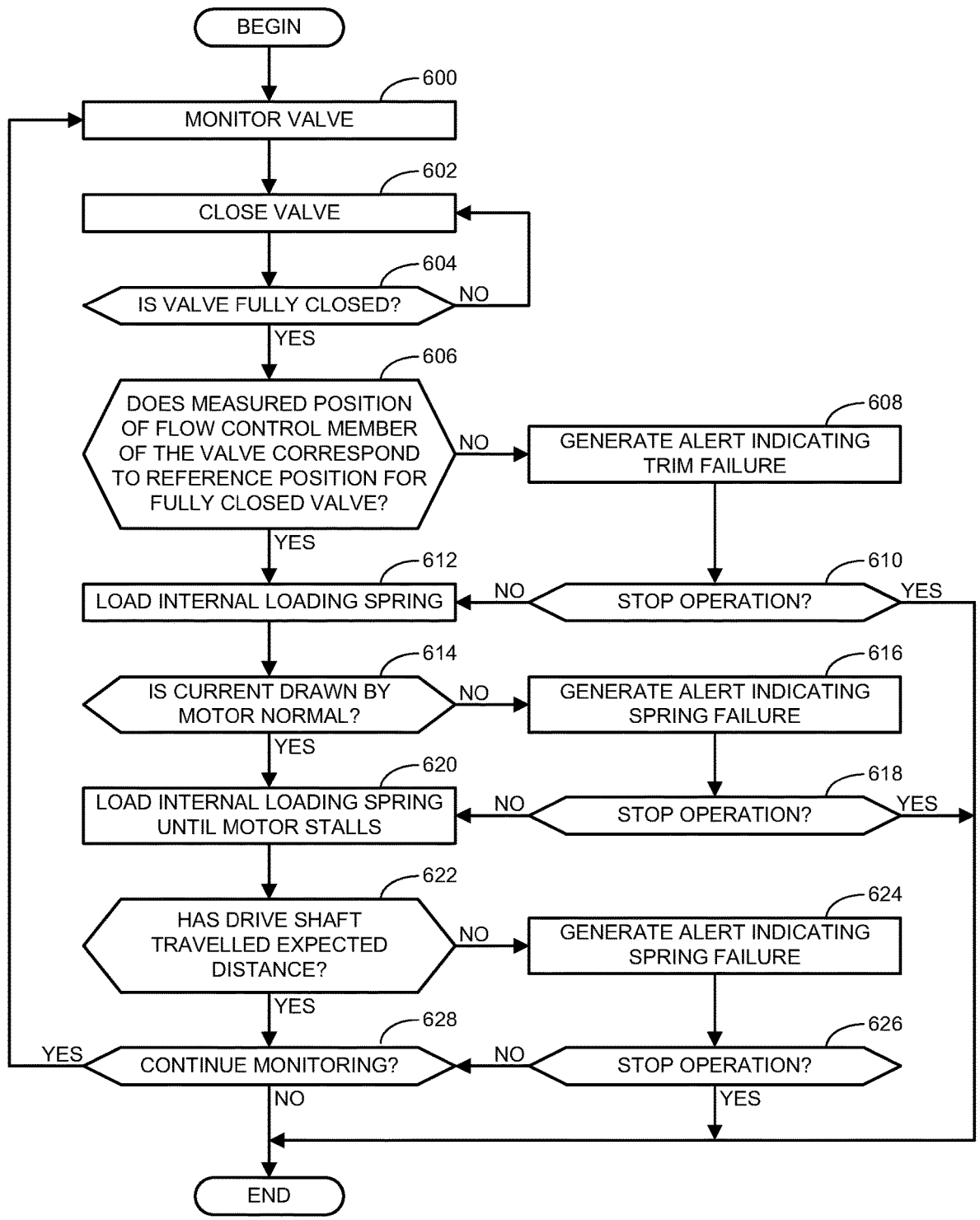
FIGS. 6-7 are flowcharts representative of example processes for implementing the example actuator of FIG. 1
Figure 7:
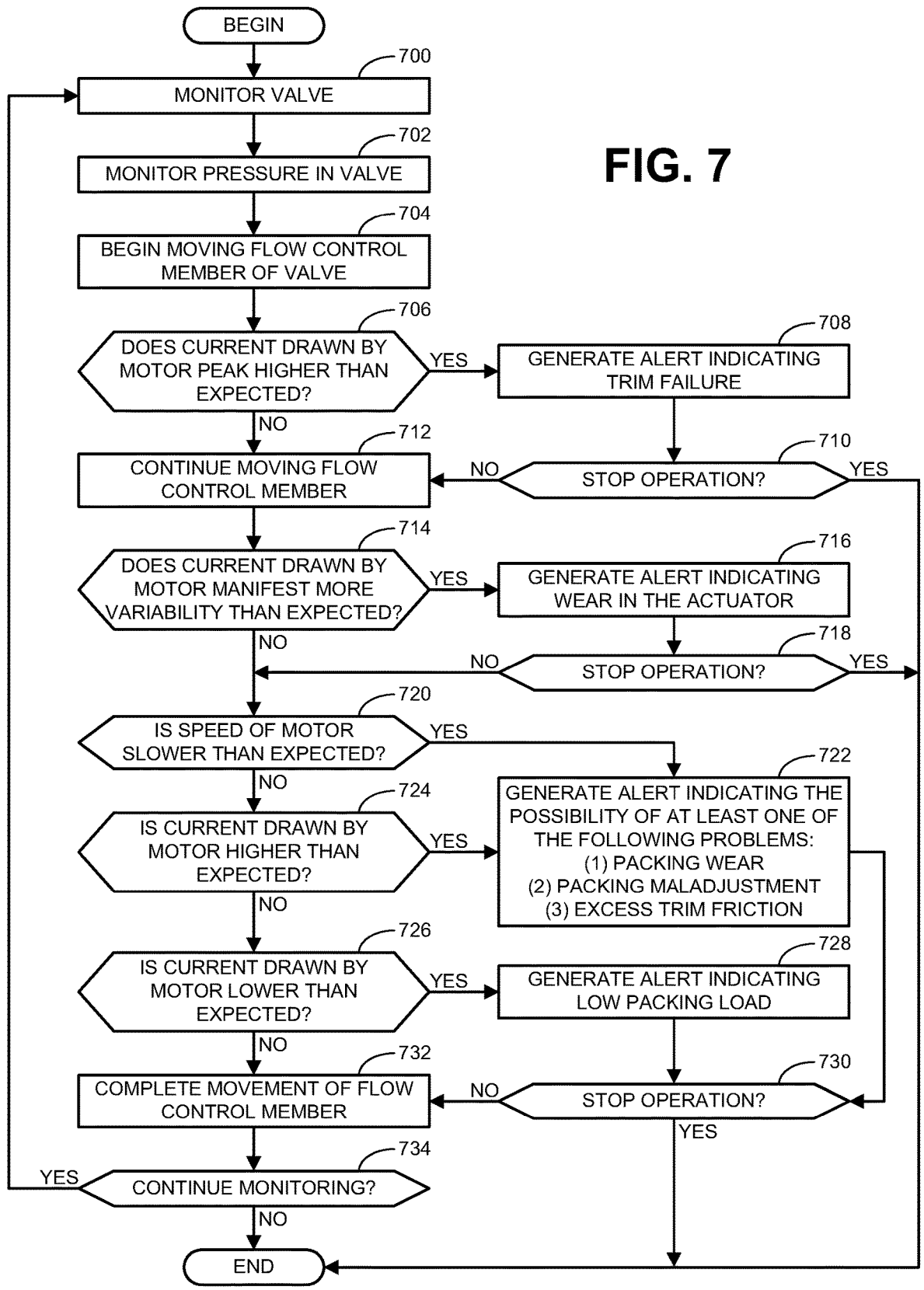

Flowcharts representative of example methods for implementing the example actuator 100 of FIG. 1 are shown in FIGS. 6-7. In these examples, the methods may be implemented using machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6-7, many other methods of implementing the example actuator 100 may alternatively be used. For example, the order of execution of the blocks may be changed, and/or some of the blocks described may be changed, eliminated, or combined.

As mentioned above, the example processes of FIGS. 6-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 6-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The method of FIG. 6 begins at block 600 where the microcontroller 106 of the electric valve actuator 100 monitors the valve 104. In some examples, the actuator 100 directly monitors the valve 104 via the valve position sensor 116. Additionally or alternatively, in some examples, the actuator 100 indirectly monitors the valve 104 via the rotation sensors 112 and/or the current sensor 118 associated with the actuator 100. At block 602 the microcontroller 106, via the motor 110, closes the valve 104. At block 604 the microcontroller 106 determines whether the valve 104 is fully closed. In some examples, the determination is made based on detecting when the valve plug has reached the valve seat resulting in a hard stop. In some examples, the hard stop is detected via the valve position sensor 116. In some examples, the hard stop is detected based on when the motor 110 of the actuator 100 stalls (e.g., when there is no internal loading spring). In other examples, where there is an internal loading spring, the fully closed position is determined based on a known distance travelled by the drive shaft to fully load the internal loading spring and the point where the motor 110 stalls. In some examples, the fully closed position of the valve 104 is determined based on a sudden change in the current drawn by the motor as detected via the current sensor 118. If the microcontroller 106 determines that the valve 104 is not fully closed, control returns to block 602 to continue closing the valve. If the microcontroller 106 determines that the valve is fully closed, control advances to block 606.

At block 606 of the example method of FIG. 6, the microcontroller 106 via the rotation sensors 112 and/or the valve position sensor 116 determines whether the measured position of the flow control member of the valve 104 corresponds to a reference position for the valve 104 when fully closed. In some examples, the reference position is defined at the time of manufacture of the valve 104. In some examples, the measured position of the flow control member is considered to correspond to the reference position if a difference between the measured position of the flow control member and the reference position is within a threshold. If the microcontroller 106 determines that the measured position of the flow control member does not correspond to the reference position (e.g., the difference exceeds the threshold), the microcontroller 106 generates an alert indicating trim failure (block 608) after which the microcontroller 106 determines whether to stop the operation of the valve 104 (block 610). If the microcontroller 106 determines to stop the operation, the example method of FIG. 6 ends. If the microcontroller 106 determines not to stop the operation of the valve 104 (block 610), control advances to block 612 where the motor 110 loads the internal loading spring of the actuator 100. In some examples, such as where there has been a spring failure, loading the spring includes the motor 110 travelling a certain distance (e.g., corresponding to the no load region 226 of FIG. 2) past the fully closed valve position before actually beginning to load the spring. Returning to block 606, if the microcontroller 106 determines that the measured position of the flow control member does correspond to the reference position (e.g., the difference does not exceed the threshold), control advances to block 612 where the motor 110 loads the internal loading spring.

At block 614 the microcontroller 106 determines, via the current sensor 118, whether the current drawn by the motor 110 is normal. In some examples, the microcontroller 106 determines whether the current drawn by the motor 110 is normal by comparing the measured current to a reference current determined at the time of manufacture of the actuator 100. In some examples, the current drawn by the motor 110 is considered to be normal if a difference between the measured current and the reference current is within a threshold. If the microcontroller 106 determines that the current drawn by the motor 110 is not normal (e.g., the difference exceeds the threshold), the microcontroller 106 generates an alert indicating spring failure (block 616) after which the microcontroller 106 determines whether to stop the operation of the valve 104 (block 618). If the microcontroller 106 determines to stop the operation, the example method of FIG. 6 ends. If the microcontroller 106 determines not to stop the operation of the valve 104 (block 618), control advances to block 620 where the motor 110 loads the internal loading spring until the motor 110 stalls (e.g., corresponding to a fully loaded spring). Returning to block 614, if the microcontroller 106 determines that the current drawn by the motor 110 is normal, control advances to block 620 where the motor 110 loads the internal loading spring until the motor 110 stalls.

At block 622 the microcontroller 106 determines, via the rotation sensors 112, whether the drive shaft of the motor 110 has travelled an expected distance. In some examples, the expected distance may correspond to either an entire travel span of the drive shaft of the motor 110 or the travel span of the drive shaft solely when loading the internal loading spring (e.g., the spring span). In either case, the expected distance is defined by a reference distance determined at the time of manufacture of the actuator 100 relative to a reference location. In some examples, the motor 110 is considered to have travelled an expected distance if a difference between the measured distance travelled by the drive shaft and the reference distance is within a threshold. If the microcontroller 106 determines that the motor 110 has not travelled an expected distance (e.g., the difference exceeds the threshold), the microcontroller 106 generates an alert indicating a spring failure (block 624). In some examples, where the actuator 100 only implements the rotation sensors 112 as a measure of position and/or movement of the flow control member within the valve 104, each of the alerts generated at block 608 and block 624 indicate the possibility of at least one of a trim failure or a spring failure because the rotation sensors 112 cannot distinguish between these failures without a secondary measure (e.g., via the valve position sensor 116). Once the alert has been generated (block 624) the microcontroller 106 determines whether to stop the operation of the valve 104 (block 626). If the microcontroller 106 determines to stop the operation, the example method of FIG. 6 ends. If the microcontroller 106 determines not to stop the operation of the valve 104 (block 626), control advances to block 628 where the microcontroller 106 determines whether to continue monitoring the valve 104. Returning to block 622, if the microcontroller 106 determines that the drive shaft has travelled an expected distance, control advances to block 628. If the microcontroller 106 determines to continue monitoring the valve 104 (block 628), control returns to block 600. If the microcontroller 106 determines not to continue monitoring the valve 104, the example method of FIG. 6 ends.

The method of FIG. 7 begins at block 700 where the microcontroller 106 of the electric valve actuator 100 monitors the valve 104. In some examples, the actuator 100 directly monitors the valve 104 via the valve position sensor 116. Additionally or alternatively, in some examples, the actuator 100 indirectly monitors the valve 104 via the rotation sensors 112 and/or the current sensor 118 associated with the actuator 100. At block 702 the microcontroller 106 monitors the pressure in the valve 104. In some examples, the pressure is measured via a pressure sensor that provides feedback to the microcontroller 106 via the communication interface 124. At block 712 the microcontroller 106, via the motor 110, begins moving the flow control member of the valve 104. At block 706, the microcontroller 106, via the current sensor 118, determines whether the current drawn by the motor 110 peak higher than expected. In some examples, the expected peak for the current corresponds to a reference current associated with a peak (e.g., the peaks 308, 314 of FIGS. 3-5) current drawn by the motor 110 determined at the time of manufacture of the valve 104. In some examples, the current drawn by the motor 110 is considered to peak higher than expected if the peak current drawn by the motor 110 is higher than the reference current by at least a threshold. If the microcontroller 106 determines that the peak current drawn by the motor 110 is higher than expected, the microcontroller 106 generates an alert indicating trim failure (block 708) after which the microcontroller 106 determines whether to stop the operation of the valve 104 (block 710). If the microcontroller 106 determines to stop the operation, the example method of FIG. 7 ends. If the microcontroller 106 determines not to stop the operation of the valve 104 (block 710), control advances to block 712 where the motor 110 continues to move the flow control member. If the microcontroller 106 determines that the peak current drawn by the motor 110 is not higher than expected (block 706), control advances to block 712.

At block 714, the microcontroller 106 determines, via the current sensor 118, whether the current drawn by the motor 110 manifests more variability than expected. In some examples, the microcontroller 106 determines whether the current drawn by the motor 110 manifests more variability than expected by comparing the variability of a measured amount of current drawn by the motor 110 to the variability of a reference current determined at the time of manufacture of the actuator 100. In some examples, the current drawn by the motor 110 is considered to manifest more variability than expected if the variability is higher than the variability of the reference current by at least a threshold. If the microcontroller 106 determines that the current drawn by the motor 110 manifests more variability than expected, the microcontroller 106 generates an alert indicating wear in the actuator (block 716) after which the microcontroller 106 determines whether to stop the operation of the valve 104 (block 718). If the microcontroller 106 determines to stop the operation, the example method of FIG. 7 ends. If the microcontroller 106 determines not to stop the operation of the valve 104 (block 718), control advances to block 720. If the microcontroller 106 determines that the current drawn by the motor 110 does not manifest more variability than expected (block 714), control advances to block 720.

At block 720 the microcontroller 106 determines whether the speed of the motor 110 is slower than expected. In some examples, the expected speed is based on the speed defined by the microcontroller 106 based on a control strategy to control the valve 104. As the microcontroller 106 directly controls the motor 110, via the motor driver 108, the speed of the motor 110 should be as expected unless there is insufficient current available because the current required by the motor 110 exceeds the upper limit of current available. Accordingly, if the microcontroller 106 determines that the speed of the motor 110 is slower than expected, the microcontroller 106, at block 722, generates an alert indicating the possibility of at least one of the following problems: (1) packing wear, (2) packing maladjustment, and/or (3) excess trim friction. In the example method of FIG. 7, control then advances to block 730 where the microcontroller 106 determines whether to stop the operation of the valve 104. If the microcontroller 106 determines to stop the operation, the example method of FIG. 7 ends. If the microcontroller 106 determines not to stop the operation of the valve 104 (block 730), control advances to block 732 where the motor 110 completes the movement of the flow control member.

Returning to block 720, if the microcontroller 106 determines that the speed of the motor 110 is not slower than normal, the microcontroller 106 determines, via the current sensor 118, whether the current drawn by the motor 110 is higher than expected (block 724). In some examples, the microcontroller 106 determines whether the current drawn by the motor 110 is higher than expected by comparing the measured amount of current drawn by the motor 110 to a reference current determined at the time of manufacture of the actuator 100. In some examples, the reference current is dependent upon the pressure in the valve 104. As such, in some examples, the microcontroller 106 compares the monitored current with the reference current corresponding to the pressure in the valve determined at block 702. In some examples, the current drawn by the motor 110 is considered to be higher than expected if the current drawn by the motor 110 is higher than the reference current by at least a threshold. If the microcontroller 106 determines that the current drawn by the motor 110 is higher than expected, control returns to block 722 where the microcontroller 106 generates the alert as described above.

If the microcontroller 106 determines that the current drawn by the motor 110 is not higher than expected, control advances to block 726 where the microcontroller 106 determines, via the current sensor 118, whether the current drawn by the motor 110 is lower than expected. In some examples, the microcontroller 106 determines whether the current drawn by the motor 110 is lower than expected in the same manner as described above in connection with block 724 except that determination is based on the current drawn by the motor 110 being lower than the reference current by at least a threshold. If the microcontroller 106 determines that the current drawn by the motor 110 is lower than expected, the microcontroller 106 generates an alert indicating a low packing load (block 728) after which the microcontroller 106 determines whether to stop the operation of the valve 104 (block 730) as described above. If the microcontroller 106 determines that the current drawn by the motor 110 is not lower than expected, control advances to block 732 where the microcontroller 106, via the motor 110, completes the movement of the flow control member. At block 734, the microcontroller 106 determines whether to continue monitoring the valve 104. If the microcontroller 106 determines to continue monitoring the valve 104, control returns to block 700. If the microcontroller 106 determines not to continue monitoring the valve 104, the example method of FIG. 7 ends.

Figure 8:
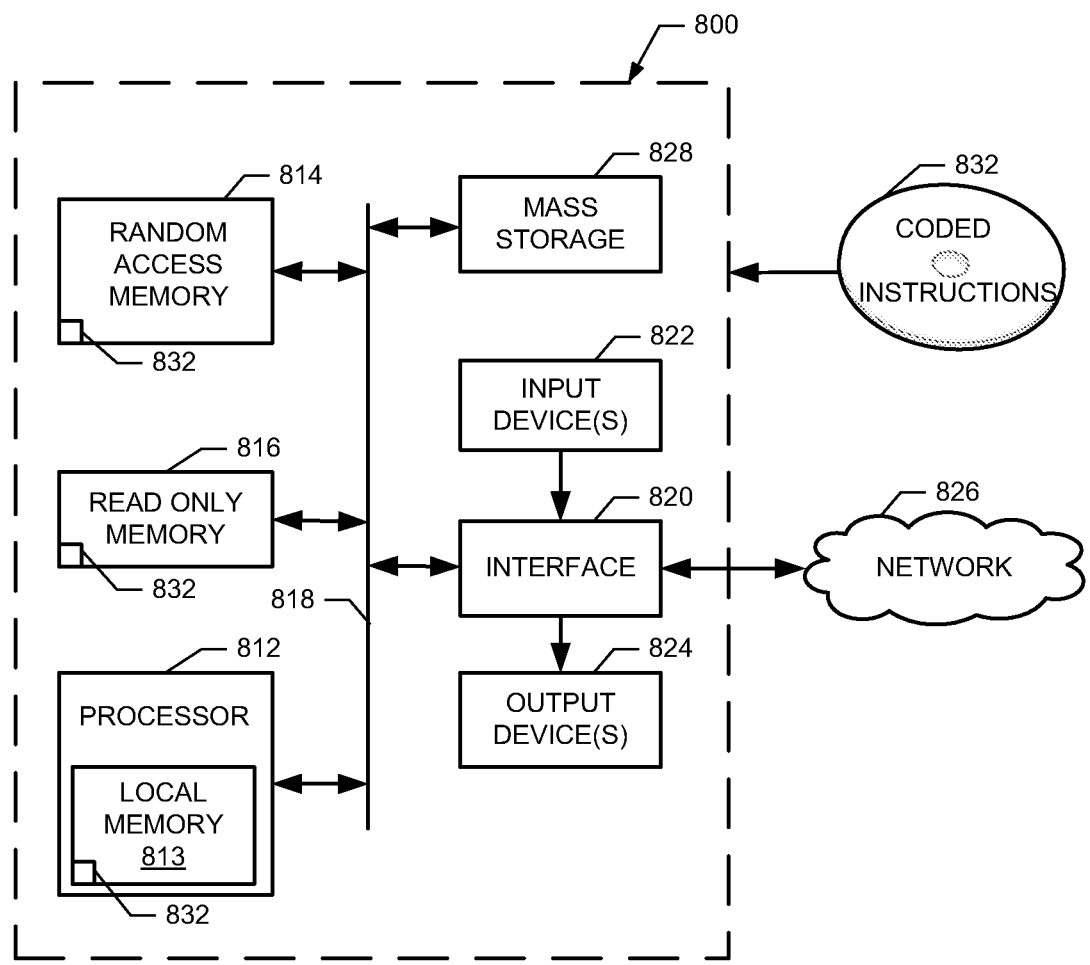
FIG. 8 is a schematic illustration of an example processor platform that may be used and/or programmed to carry out the example processes of FIGS. 6-7 and/or, more generally, to implement the example actuator of FIG. 1.

FIG. 8 is a block diagram of an example processor platform 800 capable of executing the instructions of FIGS. 6-7 to implement the actuator 100 of FIG. 1. The processor platform 800 can be, for example, a server, a personal computer, a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the methods of FIGS. 6-7 may be stored in the mass storage device 828, in the volatile memory 814, in the non-volatile memory 816, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An electric valve actuator comprising:
an electric motor to actuate a valve;
rotation sensors to monitor a rotation of a drive shaft associated with the electric motor to determine a distance travelled by the drive shaft;
a valve position sensor to
determine a measured position of a flow control member of the valve when the valve is fully closed at a first point in time; and
a processor to generate an alert based on a difference between the measured position and a reference position, the reference position corresponding to a position of the flow control member of the valve when the valve is fully closed at a second point in time before the first point in time, the alert associated with a failure of the valve.

2. The electric valve actuator of claim 1, wherein the alert is to indicate a trim failure based on the difference.

3. The electric valve actuator of claim 2, wherein the measured position of the flow control member when the valve is fully closed is determined based on the valve position sensor detecting when the flow control member stops moving.

4. The electric valve actuator of claim 2, wherein the measured position of the flow control member when the valve is fully closed is determined based on the rotation sensors detecting the distance travelled by the drive shaft before the electric motor stalls when closing the valve.

5. The electric valve actuator of claim 1, further comprising a current sensor to monitor a current drawn by the electric motor when the electric motor is moving the flow control member, the processor to compare the current drawn by the electric motor to a reference current and to generate the alert based on the comparison.

6. The electric valve actuator of claim 5, wherein the processor is to generate a second alert indicative of at least one of packing wear, packing maladjustment, or excess trim friction when the current drawn by the electric motor is higher than the reference current by at least a first threshold, and wherein the second alert is to indicate a low packing load when the current drawn by the electric motor is lower than the reference current by at least a second threshold.

7. The electric valve actuator of claim 5, wherein the alert is to indicate a trim failure when a difference between a peak of the current drawn by the electric motor and a peak of the reference current exceeds a threshold.

8. The electric valve actuator of claim 1, further comprising an internal loading spring to bias the valve when electric power to the electric valve actuator is removed, the internal loading spring loaded by the electric motor before the electric power is removed when the drive shaft travels past a location corresponding to when the valve becomes fully closed.

9. The electric valve actuator of claim 8, wherein the processor is to determine, via the rotation sensors, the distance travelled by the drive shaft when the electric motor stalls and to generate the alert to indicate at least one of a spring failure or a trim failure when a difference between the distance travelled by the drive shaft when the electric motor stalls and a reference distance exceeds a threshold.

10. The electric valve actuator of claim 9, wherein the processor is to:
monitor differences between the distance travelled by the drive shaft and the reference distance during a series of successive strokes of the valve; and
generate the alert to indicate one of the spring failure or the trim failure based on a rate at which the differences change.

11. The electric valve actuator of claim 8, further comprising a current sensor to monitor a current drawn by the electric motor when the electric motor is loading the internal loading spring, the processor to generate a second alert to indicate a spring failure if a difference between the current drawn by the electric motor and a reference current exceeds a threshold.

12. A method comprising:
monitoring, via rotation sensors, a distance travelled by a drive shaft associated with an electric motor of an electric valve actuator used to operate a valve;
determining a measured position of a flow control member of the valve, via a valve position sensor when the valve is fully closed at a first point in time; and
generating, by executing an instruction on a processor, an alert based on a difference between the measured position and a reference position, the reference position corresponding to a position of the flow control member of the valve when the valve is fully closed at a second point in time before the first point in time, the alert associated with a failure of the valve.

13. The method of claim 12, wherein the alert is indicative of a trim failure.

14. The method of claim 12, further comprising:
monitoring a current drawn by the electric motor when the electric motor is moving the flow control member;
comparing the current drawn by the electric motor to a reference current;
if the current drawn by the electric motor is higher than the reference current by at least a first threshold, generating a second alert to indicate at least one of packing wear, packing maladjustment, or excess trim friction; and
if the current drawn by the electric motor is lower than the reference current by at least a second threshold, generating the second alert to indicate a low packing load.

15. The method of claim 12, further comprising:
monitoring a current drawn by the electric motor when opening the valve from a fully closed position;
calculating a difference between a peak of the current drawn by the electric motor and a peak of a reference current; and
if the difference between the peak of the current drawn by the electric motor and the peak of the reference current exceeds a threshold, generating the alert to indicate trim failure.

16. The method of claim 12, further comprising:
determining the distance travelled by the drive shaft when the electric motor stalls, calculating a difference between the distance travelled by the drive shaft and a reference distance; and
if the difference between the distance travelled by the drive shaft and the reference distance exceeds a threshold, generating the alert to indicate at least one of a spring failure or a trim failure.

17. The method of claim 12, further comprising:
monitoring a current drawn by the electric motor when the electric motor is loading an internal loading spring;
comparing the current drawn by the electric motor to a reference current; and
if a difference between the current drawn by the electric motor and the reference current exceeds a threshold, generating a second alert to indicate a spring failure.

18. A tangible machine readable storage medium comprising instructions that, when executed, cause a machine to at least:
monitor a distance travelled by a drive shaft associated with an electric motor of an electric valve actuator used to operate a valve;
determine a measured position of a flow control member of the valve, via a valve position sensor when the valve is fully closed at a first point in time; and
generate an alert based on a difference between the measured position and a reference position, the reference position corresponding to a position of the flow control member of the valve when the valve is fully closed at a second point in time before the first point in time, the alert associated with a failure of the valve.

19. The storage medium of claim 18, wherein the instructions, when executed, further cause the machine to:
monitor a current drawn by the electric motor when the electric motor is moving the flow control member;
compare the current drawn by the electric motor to a reference current;
if the current drawn by the electric motor is higher than the reference current by at least a first threshold, generate a second alert to indicate at least one of packing wear, packing maladjustment, or excess trim friction; and
if the current drawn by the electric motor is lower than the reference current by at least a second threshold, generate the second alert to indicate a low packing load.

20. The storage medium of claim 18, wherein the instructions, when executed, further cause the machine to:
determine the distance travelled by the drive shaft when the electric motor stalls;
calculate a difference between the distance travelled by the drive shaft and a reference distance; and
if the difference between the distance travelled by the drive shaft and the reference distance exceeds a threshold, generate the alert to indicate at least one of a spring failure or a trim failure.

* * * * *